(12) United States Patent
Abe

(10) Patent No.: US 6,671,106 B2
(45) Date of Patent: Dec. 30, 2003

(54) TELESCOPIC LENS SYSTEM

(75) Inventor: Tetsuya Abe, Hokkaido (JP)

(73) Assignee: Pentax Corporation, Tokyo (JP)

(*) Notice: Subject to any disclaimer, the term of this patent is extended or adjusted under 35 U.S.C. 154(b) by 0 days.

(21) Appl. No.: 10/252,701

(22) Filed: Sep. 24, 2002

(65) Prior Publication Data

US 2003/0099046 A1 May 29, 2003

(30) Foreign Application Priority Data

Sep. 28, 2001 (JP) ............................ 2001-300479

(51) Int. Cl.$^7$ ............................................ G02B 13/02
(52) U.S. Cl. ................................. 359/746; 359/747
(58) Field of Search ............................ 359/745–748

(56) References Cited

U.S. PATENT DOCUMENTS

| | | |
|---|---|---|
| 4,067,027 A | 1/1978 | Yamazaki |
| 4,262,988 A | 4/1981 | Ishibai et al. |
| 4,400,065 A | 8/1983 | Nagler |
| 5,583,692 A | 12/1996 | Funatsu |
| 5,729,390 A | 3/1998 | Abe |
| 5,926,657 A | 7/1999 | Hasushita |
| 6,088,053 A | 7/2000 | Hammack et al. |
| 2001/0028498 A1 | 10/2001 | Haga et al. |

FOREIGN PATENT DOCUMENTS

| | | |
|---|---|---|
| JP | 57-79909 | 5/1982 |
| JP | 62-96919 | 5/1987 |
| JP | 5-2132 | 1/1993 |
| JP | 6-2330 | 1/1994 |
| JP | 7-8848 | 2/1995 |
| JP | 7-283978 | 10/1995 |
| JP | 2624556 | 4/1997 |
| JP | 11-248996 | 9/1999 |
| JP | 2001-281555 | 10/2001 |
| JP | 2001-311868 | 11/2001 |
| WO | 01/52531 | 7/2001 |

OTHER PUBLICATIONS

English Language Abstract of JP 11–248996.
English Language Abstract of JP 2001–311868.

*Primary Examiner*—Scott J. Sugarman
(74) *Attorney, Agent, or Firm*—Greenblum & Bernstein, P.L.C.

(57) ABSTRACT

A telescopic lens system includes a positive first lens group, and a positive second lens group. The first lens group includes cemented lens elements having a positive lens element and a negative lens element. The second lens group includes a positive lens element and a negative lens element. The telescopic lens system satisfies the following condition:

$$0.6 < \Sigma|S1_I|/\Sigma|S1| \qquad (1)$$

wherein
  $\Sigma|S1_I|$ designates the total sum of the absolute values of the spherical aberration coefficients (Seidel coefficients) of the first lens group, and
  $\Sigma|S1|$ designates the total sum of the absolute values of the spherical aberration coefficients (Seidel coefficients) of the entire telescopic lens system.

6 Claims, 5 Drawing Sheets

SPHERICAL
ABERRATION

CHROMATIC
ABERRATION

Fig. 2B

LATERAL
CHROMATIC
ABERRATION

Fig. 2C

ASTIGMATISM

Fig. 2D

DISTORTION

Fig. 3

Fig. 4A
FNo.=4.0
— d Line
---- g Line
--- C Line
-0.02  0.02
SPHERICAL
ABERRATION
CHROMATIC
ABERRATION Fig. 4B
W=4.6
-0.005  0.005
LATERAL
CHROMATIC
ABERRATION Fig. 4C
W=4.6
— S
-- M
-0.02  0.02
ASTIGMATISM Fig. 4D
W=4.6
-1 (%) 1
DISTORTION

Fig. 5

Fig. 6A
FNo.=4.0

—— d Line
········ g Line
- - - C Line

-0.02    0.02
SPHERICAL
ABERRATION

CHROMATIC
ABERRATION

Fig. 6B
W=4.4

-0.005   0.005
LATERAL
CHROMATIC
ABERRATION

-0.02    0.02
ASTIGMATISM

Fig. 6D
W=4.4

-1   (%)   1
DISTORTION

FNo.=4.0

— d Line
······· g Line
--- C Line

SPHERICAL
ABERRATION

CHROMATIC
ABERRATION

LATERAL
CHROMATIC
ABERRATION

ASTIGMATISM

DISTORTION

SPHERICAL
ABERRATION
CHROMATIC
ABERRATION

LATERAL
CHROMATIC
ABERRATION

ASTIGMATISM

DISTORTION

TELESCOPIC LENS SYSTEM

BACKGROUND OF THE INVENTION

1. Field of the Invention

The present invention relates to a telescopic lens system, and in particular, relates to a telescopic lens system applied to a video camera or a digital camera and the like.

2. Description of the Prior Art

As an optical system used as a telescopic lens system, a Petzval-type optical system, including a positive first lens group constituted by a combination of a positive lens element and a negative lens element, and a positive second lens group also constituted by a combination of a positive lens element and a negative lens element, is known in the art.

In this Petzval-type optical system, in each of the first and second lens groups, by providing a positive lens element with a strong converging function and a negative lens element with a strong diverging function, spherical aberration and chromatic aberration can be cancelled out, so that optimum optical performance can be obtained.

However, in a conventional Petzval-type optical system, it is necessary to correctly align the optical axes of the positive and negative lens elements of the first and second lens groups. This is because if the two optical axes thereof are even slightly out of alignment, aberrations, such as axial coma, etc., largely occur. In particular, in video cameras and digital cameras, miniaturization of the image pick-up device has further increased, and higher definition thereof is being achieved. Therefore higher optical performance is required to the optical system, so that higher precision is necessary for the manufacturing process of video and digital cameras. As a result, the cost thereof increases.

SUMMARY OF THE INVENTION

The present invention provides a Petzval-type telescopic lens system which has (i) an f-number of about 4, and (ii) a half angle-of-view of about 4 degrees; and which (iii) is constituted by about four lens elements, (iv) is free from optical deterioration caused by decentration of lens elements, (v) is produced at a low cost, and (vi) has optimum optical performance.

The present invention is devised based on the conception that by cementing the positive lens element and the negative lens element of the first lens group in a Petzval-type telescopic lens system, the optical axes of the positive and negative lens elements are prevented from being out of alignment, and the correcting of spherical aberration, which is considered to be important to attain preferable optical performance, is intensively performed by the first lens group, so that occurrences of aberrations can be reduced.

According to an aspect of the present invention, there is provided a telescopic lens system including a positive first lens group, and a positive second lens group, in this order from the object. The first lens group includes cemented lens elements having a positive lens element and a negative lens element. The second lens group includes a positive lens element and a negative lens element. The telescopic lens system satisfies the following condition:

$$0.6 < \Sigma|S1_I|/\Sigma|S1| \quad (1)$$

wherein $\Sigma|S1_I|$ designates the total sum of the absolute values of the spherical aberration coefficients (Seidel coefficients) of the first lens group, and $\Sigma|S1|$ designates the total sum of the absolute values of the spherical aberration coefficients (Seidel coefficients) of the entire telescopic lens system.

The telescopic lens system according to the present invention preferably satisfies the following conditions:

$$0 < \Sigma S1/\Sigma S1_I < 3.5 \quad (2)$$

$$20 < \nu_{Ip} - \nu_{In} \quad (3)$$

wherein $\Sigma S1$ designates the total sum of the spherical aberration coefficients (Seidel coefficients) of the entire telescopic lens system;

$\Sigma S1_I$ designates the total sum of the spherical aberration coefficients (Seidel coefficients) of said positive first lens group;

$\nu_{Ip}$ designates the Abbe number of the positive lens element of the positive first lens group, and $\nu_{In}$ designates the Abbe number of the negative lens element of the positive first lens group.

The telescopic lens system according to the present invention preferably satisfies the following condition:

$$-1 < \Sigma P_{II}/\Sigma P < 0 \quad (4)$$

wherein $\Sigma P_{II}$ designates the Petzval Sum of the positive second lens group; and $\Sigma P$ designates the Petzval Sum of the entire telescopic lens system.

The telescopic lens system according to the present invention can satisfy the following condition:

$$-0.2 < \Sigma S2/\Sigma S2_{II} < 0 \quad (5)$$

wherein $\Sigma S2$ designates the total sum of the coma coefficients (Seidel coefficients) of the entire telescopic lens system; and $\Sigma S2_{II}$ designates the total sum of the coma coefficients (Seidel coefficients) of the positive second lens group.

The telescopic lens system according to the present invention preferably satisfies the following conditions:

$$0.5 < f/f_I < 0.9 \quad (6)$$

$$0.15 < D_{I-II}/f < 0.7 \quad (7)$$

wherein f designates the focal length of the entire telescopic lens system;

$f_I$ designates the focal length of the positive first lens group, and $D_{I-II}$ designates the distance between the positive first lens group and the positive second lens group.

The telescopic lens system according to the present invention can satisfy the following condition:

$$1 < AC_I/AC_{II} \quad (8)$$

wherein $AC_I$ designates the total sum of the absolute values of the reciprocal of the product of the focal length and the Abbe number ($|1/(fi*vi)|$) of each lens elements in the positive first lens group; and $AC_{II}$ designates the total sum of the absolute values of the reciprocal of the product of the focal lengths and the Abbe number($|1/(fi*vi)|$) of each o lens elements in the positive second lens group.

The present disclosure relates to subject matter contained in Japanese Patent Application No. 2001-300479 (filed on Sep. 28, 2001) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
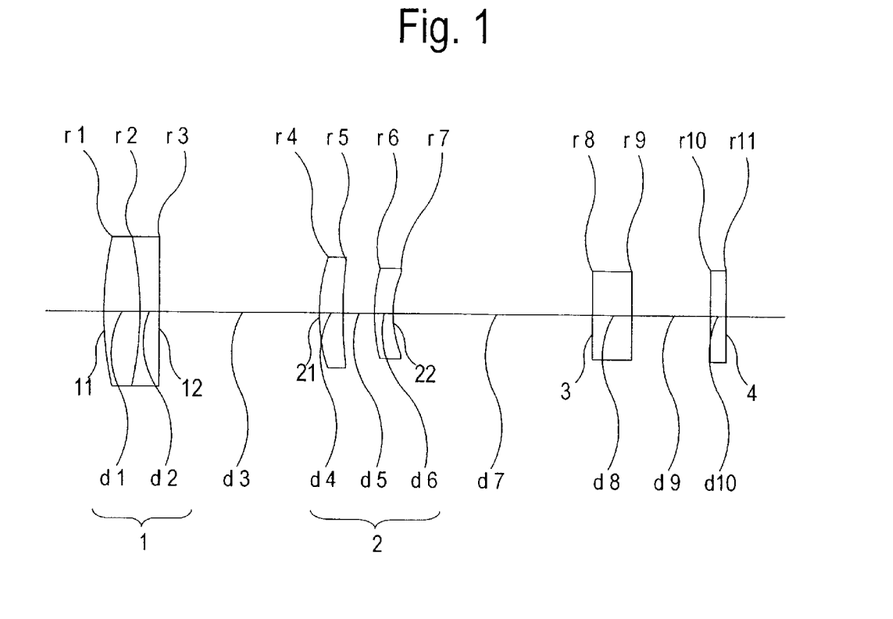
FIG. 1 is a lens arrangement of a telescopic lens system, according to a first embodiment of the present invention.
Figures 2A, 2B:
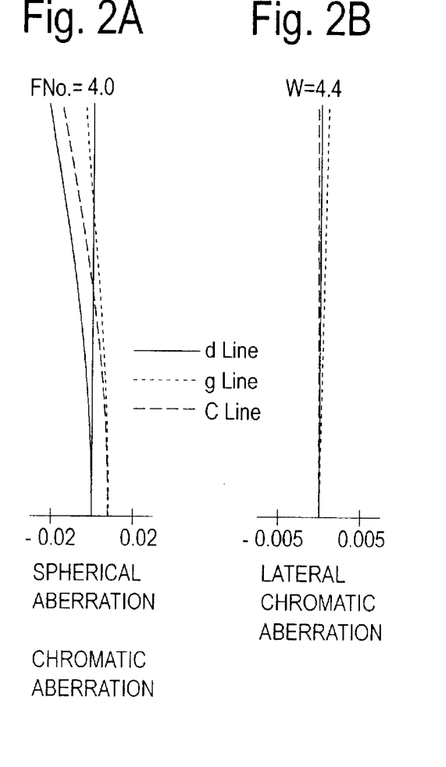
FIGS. 2A, 2B, 2C and 2D show aberrations occurred in the lens arrangement shown in FIG. 1 when an object at an infinite distance is in an in-focus state.
Figure 2C:
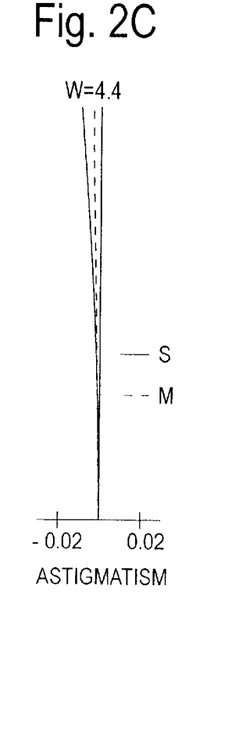
Figure 2D:
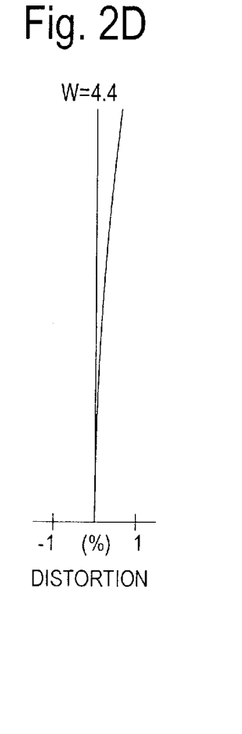

FIG. 1 is a lens arrangement of a telescopic lens system according to the of the first embodiment of the present invention, in which the telescopic lens system is applied to a digital camera which uses a CCD as an image pick-up device.

The telescopic lens system includes a positive first lens group 1 constituted by cemented lens element having a positive first lens element 11 and a negative second lens element 12, and a positive second lens group 2 constituted by a positive third lens element 21 and a negative fourth lens element 22, in this order from the object. A filter 3 (shown as a single element in FIGS. 1, 3, 5, 7 and 9) including a low-pass filter, an infrared-cut filter and the like is provided on the image-side of the fourth lens element 22. Furthermore, a cover glass 4 of the image pick-up device (CCD) is provided at the close vicinity of the image plane.

When focusing is performed, either the optical system is moved in the optical axis direction, or conversely, the image pick-up device (CCD) is moved with respect to the optical system, or each lens group can be individually moved. Furthermore, in the case where a diaphragm is provided, it is desirable to provide the diaphragm in the close vicinity of the second lens group 2.

Each of conditions (1) through (8) will be explained. Here, note that the filter 3 and the glass cover 4 are not considered in the following explanations.

Condition (1) is for preventing optical deterioration of the positive first lens group due to being out of alignment of the optical axes of the positive and negative lens groups by intensively correcting spherical aberration through the positive first lens group constituted by the positive and negative lens elements which are cemented to each other.

If $\Sigma|S1_I|/\Sigma|S1|$ exceeds the lower limit of condition (1), a lens group other than the positive lens group 1 constituted by the cemented lens elements (i.e., the lens elements of the second lens group 2) has to largely bear the burden to correct spherical aberration. Consequently, aberrations, such as axial coma and the like, due to being out of alignment of the optical axes become larger, so that preferable optical performance cannot be attained.

Condition (2) is for allowing the positive first lens group 1, which intensively corrects spherical aberration according to condition (1), to correct spherical aberration in a well balanced manner with respect to the entire telescopic lens system, and for obtaining preferable optical performance.

If $\Sigma S1/\Sigma S1_I$ exceeds the lower limit of condition (2), higher order spherical aberration occurs since spherical aberration occurred in either the positive first lens group or the positive second lens group is overcorrected.

If $\Sigma S1/\Sigma S1_I$ exceeds the upper limit of condition (2), spherical aberration which is overcorrected in the positive second lens group 2 cannot sufficiently be corrected by the positive first lens group 1, so that preferable optical performance cannot be attained.

Condition (3) is for suitably correcting chromatic aberration by setting a larger difference between the Abbe numbers of the positive lens element 11 and the negative lens element 12 in the positive first lens group 1, which contribute to the correcting of chromatic aberration.

If an attempt is made to satisfy condition (1) so that the correcting of spherical aberration is intensively performed by the positive first lens group 1, there is a need to reduce the power of the positive lens element and that of the negative lens element in the positive first lens group 1. If an attempt is further made to suitably correct chromatic aberration at the same time, the difference between the Abbe numbers of the positive lens element 11 and the negative lens element 12 of the positive first lens group 1 has to be made larger to the extent of satisfying condition (3).

If $v_{Ip}-v_{In}$ exceeds the lower limit of condition (3), chromatic aberrations cannot be corrected adequately.

Condition (4) is for correcting field curvature in the positive second lens group 2 so that preferable optical performance can be attained.

If an attempt is made to correct spherical aberration and chromatic aberration at the same time by the positive first lens group 1 constituted by the cemented lens elements, the Petzval Sum of the first lens group 1 inevitably increases in the positive direction, so that field curvature increases, and the quality of an image at the peripheral portion deteriorates. Therefore it is necessary to adequately provide a negative Petzval Sum to the second lens group 2 in order to correct field curvature.

If $\Sigma P_{II}/\Sigma P$ exceeds the lower limit of condition (4), the negative Petzval Sum of the second lens group 2 becomes excessive. Accordingly, the field curvature is overcorrected, and the quality of an image at the peripheral portion deteriorates.

If $\Sigma P_{II}/\Sigma P$ exceeds the upper limit of condition (4), field curvature cannot be adequately corrected by the second lens group 2, and the quality of an image at the peripheral portion deteriorates.

Condition (5) is for correcting coma in the positive second lens group 2 to attain preferable optical performance. Since positive coma occurs in the positive first lens group 1 constituted by the cemented lens elements, the second lens group 2 needs to have a function to appropriately correct coma.

If $\Sigma S2/\Sigma S2_{II}$ exceeds the lower limit of condition (5), coma occurred in the second lens group 2 is overcorrected, so that the quality of an image at the peripheral portion deteriorates.

If $\Sigma S2/\Sigma S2_{II}$ exceeds the upper limit of condition (5), coma occurred in the second lens group 2 cannot be adequately corrected, so that the quality of an image at the peripheral portion deteriorates.

Condition (6) is for providing an adequate power to the first lens group 1 to attain preferable optical performance and prevent the telescopic lens system from being made lager.

If $f/f_I$ exceeds the lower limit of condition (6), the focal length of the first lens group 1 becomes too long (i.e., the power thereof becomes too weak). Consequently, the overall length of the telescopic lens system becomes too long, and at the same time, the positive power of the second lens group 2 becomes too strong, so that the negative Petzval Sum which is determined according to condition (4) cannot be attained. Furthermore, field curvature cannot be corrected, and the quality of an image at the peripheral portion deteriorates.

If $f/f_I$ exceeds the upper limit of condition (6), the power of the first lens group 1 becomes too strong, so that coma occurs excessively, and the quality of an image at the peripheral portion deteriorates.

Condition (7) specifies the distance between the positive first lens group 1 in which the power thereof is determined by condition (6) and the positive second lens group 2 for the purpose of attaining preferable optical performance and preventing the telescopic lens system from being made larger.

If $D_{I-II}/f$ exceeds the lower limit of condition (7), the positive second lens group 2 approaches too close to the positive first lens group 1. As a result, negative coma excessively occurs in the positive second lens group 2, and the quality of an image at the peripheral portion deteriorates.

If $D_{I-II}/f$ exceeds the upper limit of condition (7), the second lens group 2 approaches too close to the image plane. As a result, the overall length of the telescopic lens system becomes too long, and coma occurred in the positive second lens group 2 cannot be corrected, so that the quality of an image at the peripheral portion deteriorates.

Condition (8) is for lowering precision to be required to a lens frame by intensively performing the correcting of chromatic aberration in the positive first lens group 1. This means that a portion to which higher precision is required is only the positive first lens group 1 constituted by the cemented lens elements, while precision required to the lens frame is lowered, and manufacturing costs thereof decrease.

If $AC_I/AC_{II}$ exceeds the lower limit of condition (8), precision on the lens-frame required to the positive second lens group 2 has also to be made higher, as required to the lens frame of the positive first lens group 1. Consequently, manufacturing costs thereof increase.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, W designates the incident angle (°), R designates the radius of curvature, D designates the lens-element thickness or distance between lens elements, Nd designates the refractive index of the d-line, and νd designates the Abbe number.

Embodiment 1

FIG. 1 is a lens arrangement of a telescopic lens system, according to the first embodiment of the present invention. FIGS. 2A through 2D show aberrations occurred in the lens arrangement shown in FIG. 1 when an object at an infinite distance is in an in-focus state. Table 1 shows the numerical data of the first embodiment.

TABLE 1

$F_{NO} = 1:4.0$
$f = 10.00$
$W = 4.4$
$FB = 0.14$

| NO. | R | D | Nd | νd |
|---|---|---|---|---|
| 1 | 5.619 | 0.620 | 1.51633 | 64.1 |
| 2 | −5.738 | 0.323 | 1.62004 | 36.3 |
| 3 | 372.732 | 2.695 | — | — |
| 4 | 2.958 | 0.404 | 1.56384 | 60.7 |
| 5 | 7.315 | 0.539 | — | — |
| 6 | 2.911 | 0.323 | 1.59551 | 39.2 |
| 7 | 1.752 | 3.390 | — | — |
| 8 | ∞ | 0.674 | 1.51633 | 64.1 |
| 9 | ∞ | 1.348 | — | — |
| 10 | ∞ | 0.270 | 1.51633 | 64.1 |
| 11 | ∞ | — | — | — |

Embodiment 2

Figure 3:
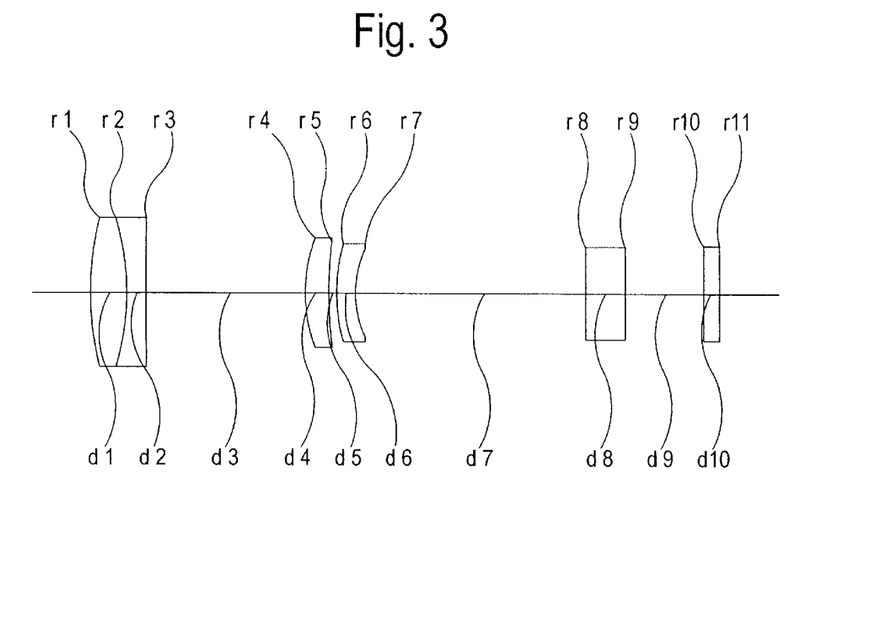
FIG. 3 is a lens arrangement of a telescopic lens system, according to a second embodiment of the present invention.
Figures 4A, 4B:
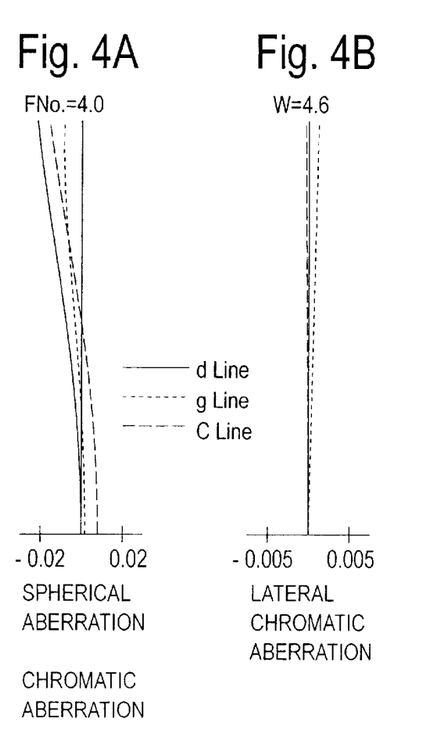
FIGS. 4A, 4B, 4C and 4D show aberrations occurred in the lens arrangement shown in FIG. 3 when an object at an infinite distance is in an in-focus state.
Figure 4C:
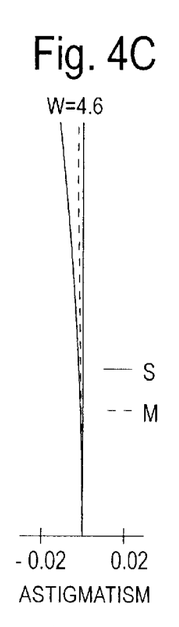
Figure 4D:
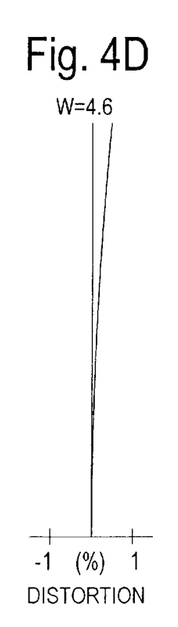

FIG. 3 is a lens arrangement of a telescopic lens system, according to the second embodiment of the present invention. FIGS. 4A through 4D show aberrations occurred in the lens arrangement shown in FIG. 3 when an object at an infinite distance is in an in-focus state. Table 2 shows the numerical data of the second embodiment.

TABLE 2

$F_{NO} = 1:4.0$
$f = 10.00$
$W = 4.6$
$FB = 0.14$

| NO. | R | D | Nd | νd |
|---|---|---|---|---|
| 1 | 5.113 | 0.619 | 1.48749 | 70.2 |
| 2 | −4.273 | 0.323 | 1.54814 | 45.8 |
| 3 | 71.749 | 2.692 | — | — |
| 4 | 2.645 | 0.404 | 1.51633 | 64.1 |
| 5 | 7.516 | 0.133 | — | — |
| 6 | 3.030 | 0.323 | 1.58144 | 40.7 |
| 7 | 1.750 | 3.899 | — | — |
| 8 | ∞ | 0.673 | 1.51633 | 64.1 |
| 9 | ∞ | 1.346 | — | — |
| 10 | ∞ | 0.269 | 1.51633 | 64.1 |
| 11 | ∞ | — | — | — |

Embodiment 3

Figure 5:
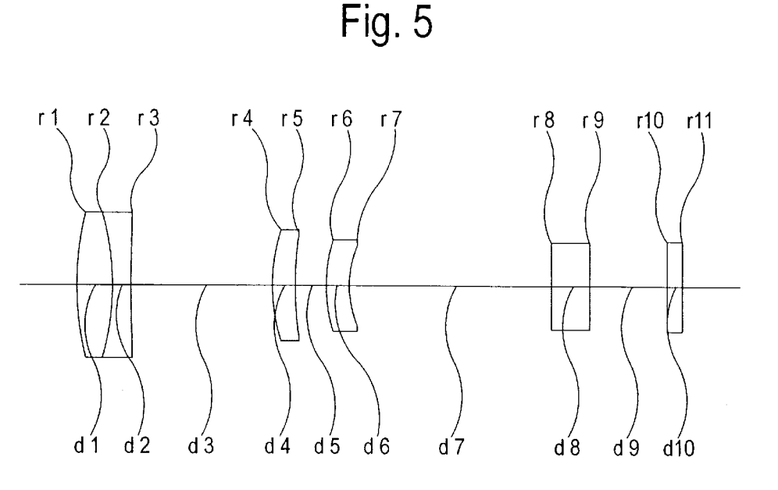
FIG. 5 is a lens arrangement of a telescopic lens system, according to a third embodiment of the present invention.
Figures 6A, 6B:
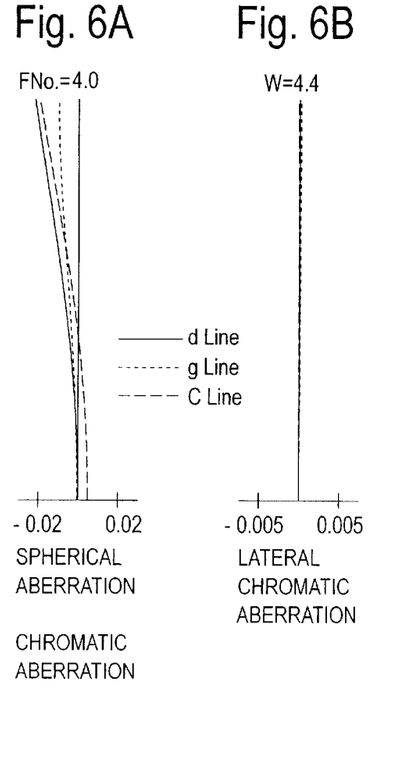
FIGS. 6A, 6B, 6C and 6D show aberrations occurred in the lens arrangement shown in FIG. 5 when an object at an infinite distance is in an in-focus state.
Figure 6C:
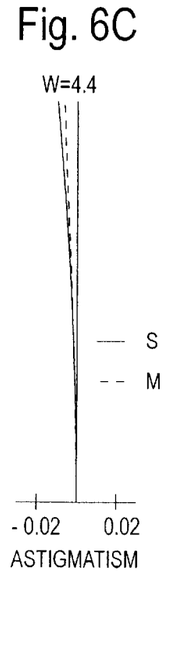
Figure 6D:
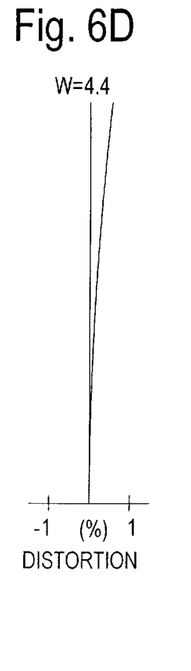

FIG. 5 is a lens arrangement of a telescopic lens system, according to the third embodiment of the present invention.

FIGS. 6A through 6D show aberrations occurred in the lens arrangement shown in FIG. 5 when an object at an infinite distance is in an in-focus state. Table 3 shows the numerical data of the third embodiment.

TABLE 3

$F_{NO} = 1:4.0$
$f = 10.00$
$W = 4.4$
$FB = 0.14$

| NO. | R | D | Nd | νd |
|---|---|---|---|---|
| 1 | 5.222 | 0.620 | 1.49700 | 81.6 |
| 2 | −4.522 | 0.323 | 1.54072 | 47.2 |
| 3 | 32.078 | 2.460 | — | — |
| 4 | 3.171 | 0.404 | 1.58913 | 61.2 |
| 5 | 6.525 | 0.539 | — | — |
| 6 | 2.692 | 0.404 | 1.56732 | 42.8 |
| 7 | 1.751 | 3.529 | — | — |
| 8 | ∞ | 0.673 | 1.51633 | 64.1 |
| 9 | ∞ | 1.347 | — | — |
| 10 | ∞ | 0.269 | 1.51633 | 64.1 |
| 11 | ∞ | — | — | — |

Embodiment 4

Figure 7:
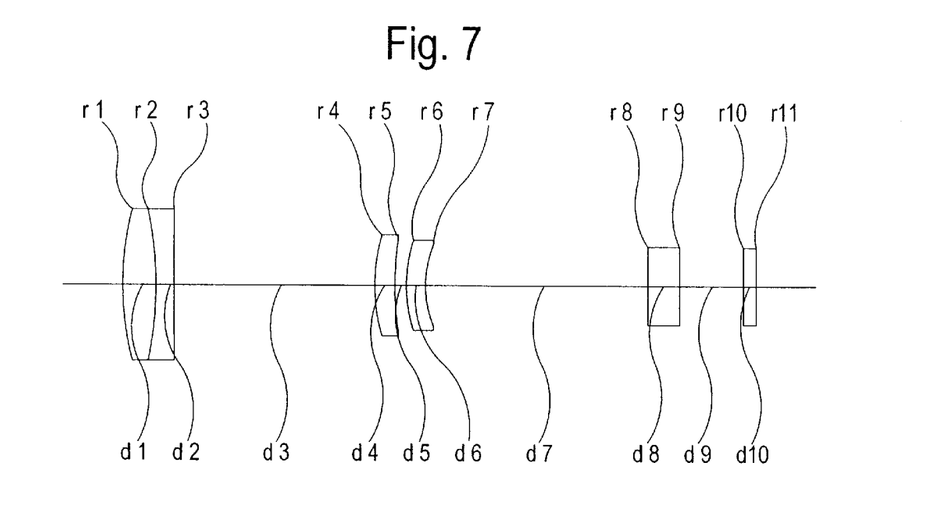
FIG. 7 is a lens arrangement of a telescopic lens system, according to a fourth embodiment of the present invention.
Figures 8A, 8B:
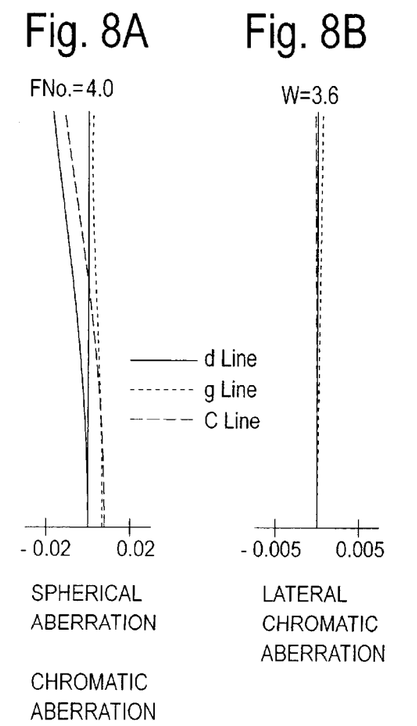
FIGS. 8A, 8B, 8C and 8D show aberrations occurred in the lens arrangement shown in FIG. 7 when an object at an infinite distance is in an in-focus state.
Figure 8C:
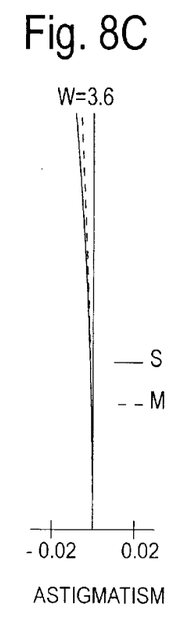
Figure 8D:
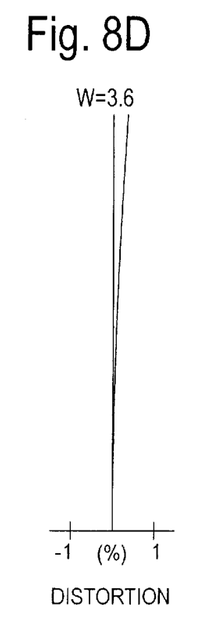

FIG. 7 is a lens arrangement of a telescopic lens system, according to the fourth embodiment of the present invention. FIGS. 8A through 8D show aberrations occurred in the lens arrangement shown in FIG. 7 when an object at an infinite distance is in an in-focus state. Table 4 shows the numerical data of the fourth embodiment.

TABLE 4

$F_{NO} = 1:4.0$
$f = 10.00$
$W = 3.6$
$FB = 0.10$

| NO. | R | D | Nd | νd |
|---|---|---|---|---|
| 1 | 5.003 | 0.553 | 1.51633 | 64.1 |
| 2 | −6.070 | 0.298 | 1.62004 | 36.3 |
| 3 | 110.616 | 3.380 | — | — |
| 4 | 2.886 | 0.340 | 1.51633 | 64.1 |
| 5 | 5.211 | 0.195 | — | — |
| 6 | 2.415 | 0.319 | 1.62004 | 36.3 |
| 7 | 1.736 | 3.751 | — | — |
| 8 | ∞ | 0.531 | 1.51633 | 64.1 |
| 9 | ∞ | 1.063 | — | — |
| 10 | ∞ | 0.213 | 1.51633 | 64.1 |
| 11 | ∞ | — | — | — |

Embodiment 5

Figure 9:
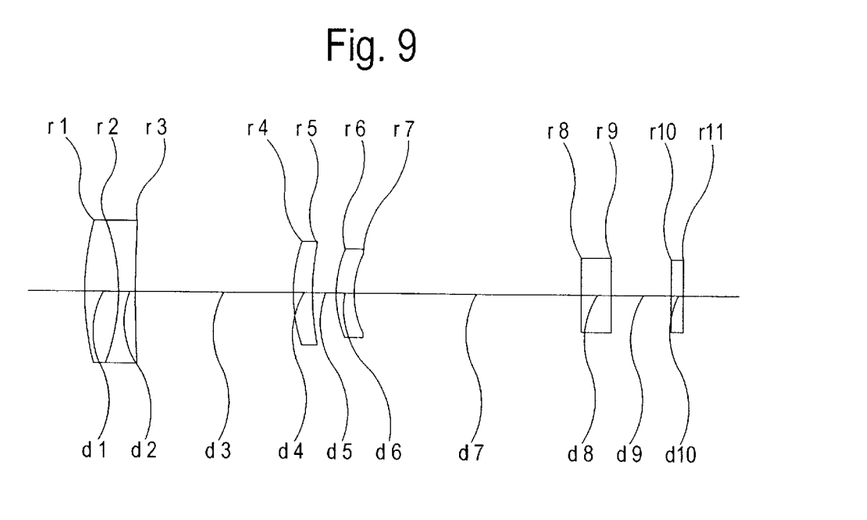
FIG. 9 is a lens arrangement of a telescopic lens system, according to a fifth embodiment of the present invention.
Figure 10A:
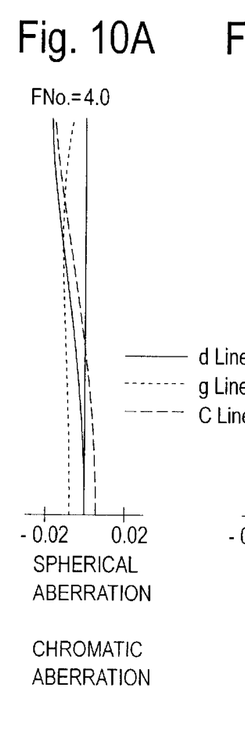
FIGS. 10A, 10B, 10C and 10D show aberrations occurred in the lens arrangement shown in FIG. 9 when an object at an infinite distance is in an in-focus state.
Figures 10B, 10C:
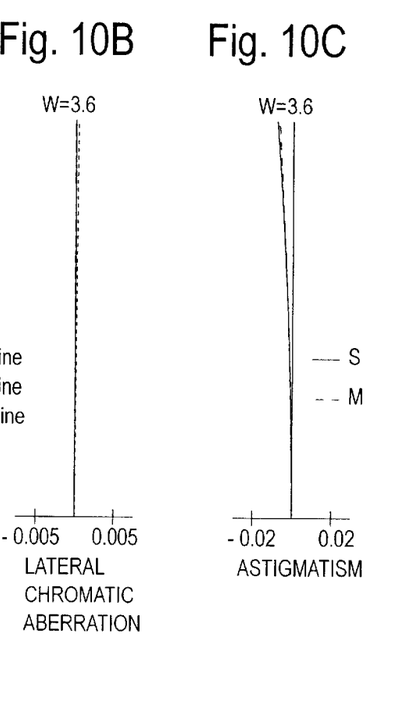
Figure 10D:
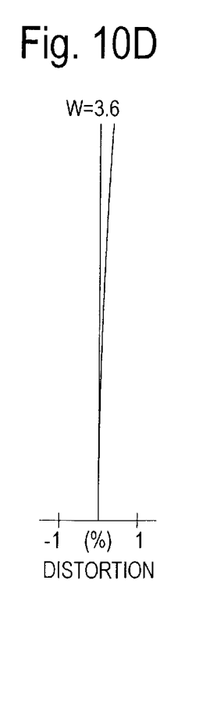

FIG. 9 is a lens arrangement of a telescopic lens system, according to the fifth embodiment of the present invention. FIGS. 10A through 10D show aberrations occurred in the lens arrangement shown in FIG. 9 when an object at an infinite distance is in an in-focus state. Table 5 shows the numerical data of the fifth embodiment.

TABLE 5

$F_{NO} = 1:4.0$
$f = 10.00$
$W = 3.6$
$FB = 0.11$

| NO. | R | D | Nd | νd |
|---|---|---|---|---|
| 1 | 4.935 | 0.595 | 1.49700 | 81.6 |
| 2 | −3.592 | 0.298 | 1.51742 | 52.4 |
| 3 | 22.780 | 2.808 | — | — |

TABLE 5-continued $F_{NO} = 1:4.0$
$f = 10.00$
$W = 3.6$
$FB = 0.11$

| NO. | R | D | Nd | νd |
|---|---|---|---|---|
| 4 | 2.831 | 0.340 | 1.51633 | 64.1 |
| 5 | 4.547 | 0.425 | — | — |
| 6 | 2.021 | 0.319 | 1.62004 | 36.3 |
| 7 | 1.576 | 4.026 | — | — |
| 8 | ∞ | 0.531 | 1.51633 | 64.1 |
| 9 | ∞ | 1.063 | — | — |
| 10 | ∞ | 0.213 | 1.51633 | 64.1 |
| 11 | ∞ | — | — | — |

The numerical values of each condition of each embodiment are shown in Table 6.

TABLE 6

|  | Embod. 1 | Embod. 2 | Embod. 3 | Embod. 4 | Embod. 5 |
|---|---|---|---|---|---|
| Cond. (1) | 0.738 | 0.655 | 0.729 | 0.852 | 0.652 |
| Cond. (2) | 2.669 | 2.220 | 0.690 | 0.463 | 0.402 |
| Cond. (3) | 27.8 | 24.4 | 34.4 | 27.8 | 29.2 |
| Cond. (4) | −0.306 | −0.112 | −0.335 | −0.193 | −0.194 |
| Cond. (5) | −0.087 | −0.038 | −0.091 | −0.084 | −0.163 |
| Cond. (6) | 0.729 | 0.745 | 0.700 | 0.815 | 0.739 |
| Cond. (7) | 0.269 | 0.269 | 0.246 | 0.338 | 0.281 |
| Cond. (8) | 1.156 | 1.142 | 1.387 | 1.638 | 2.105 |
| $\Sigma|S1_I|$ | 2.811 | 3.387 | 2.642 | 3.381 | 2.738 |
| $\Sigma|S1|$ | 3.809 | 5.171 | 3.622 | 3.968 | 4.202 |
| $\Sigma S1$ | 0.370 | 0.437 | 0.399 | 0.321 | 0.409 |
| $\Sigma S1_I$ | 0.139 | 0.197 | 0.579 | 0.693 | 1.018 |
| $\Sigma P_{II}$ | −0.122 | −0.053 | −0.122 | −0.093 | −0.081 |
| $\Sigma P$ | 0.400 | 0.477 | 0.363 | 0.483 | 0.417 |
| $\Sigma S2$ | 0.061 | 0.034 | 0.074 | 0.071 | 0.133 |
| $\Sigma S2_{II}$ | −0.695 | −0.888 | −0.820 | −0.843 | −0.817 |
| $f_I$ | 13.714 | 13.422 | 14.286 | 12.276 | 13.537 |
| $AC_I$ | 0.0058 | 0.0059 | 0.0054 | 0.0059 | 0.0061 |
| $AC_{II}$ | 0.0050 | 0.0052 | 0.0039 | 0.0036 | 0.0029 |

As can be understood from Table 6, each embodiment satisfies each condition, and as can be understood from the aberration diagrams, the various aberrations are adequately corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A telescopic lens system comprising a positive first lens group, and a positive second lens group, in this order from an object;

wherein said first lens group comprises cemented lens elements comprising a positive lens element and a negative lens element;

wherein said second lens group comprises a positive lens element and a negative lens element; and wherein said telescopic lens system satisfies the following condition:

$$0.6 < \Sigma|S1_I|/\Sigma|S1|$$

wherein $\Sigma|S1_I|$ designates the total sum of the absolute values of the spherical aberration coefficients (Seidel coefficients) of said positive first lens group; and $\Sigma|S1|$ designates the total sum of the absolute values of the spherical aberration coefficients (Seidel coefficients) of the entire telescopic lens system.

2. The telescopic lens system according to claim 1, satisfying the following conditions:

$$0 < \Sigma S1/\Sigma S1_I < 3.5$$

$$20 < \nu_{Ip} - \nu_{In}$$

wherein $\Sigma S1$ designates the total sum of the spherical aberration coefficients (Seidel coefficients) of the entire telescopic lens system;

$\Sigma S1_I$ designates the total sum of the spherical aberration coefficients (Seidel coefficients) of said positive first lens group;

$\nu_{Ip}$ designates the Abbe number of said positive lens element of said positive first lens group, and $\nu_{In}$ designates the Abbe number of said negative lens element of said positive first lens group.

3. The telescopic lens system according to claim 1, satisfying the following condition:

$$-1 < \Sigma P_{II}/\Sigma P < 0$$

wherein $\Sigma P_{II}$ designates the Petzval Sum of said positive second lens group; and $\Sigma P$ designates the Petzval Sum of the entire telescopic lens system.

4. The telescopic lens system according to claim 1, satisfying the following condition:

$$-0.2 < \Sigma S2/\Sigma S_{2II} < 0$$

wherein $\Sigma S2$ designates the total sum of the coma coefficients (Seidel coefficients) of the entire telescopic lens system; and $\Sigma S2_{II}$ designates the total sum of the coma coefficients (Seidel coefficients) of said positive second lens group.

5. The telescopic lens system according to claim 1, satisfying the following conditions:

$$0.5 < f/f_I < 0.9$$

$$0.15 < D_{I-II}/f < 0.7$$

wherein f designates the focal length of the entire telescopic lens system;

$f_I$ designates the focal length of said positive first lens group, and $D_{I-II}$ designates the distance between said positive first lens group and said positive second lens group.

6. The telescopic lens system according to claim 1, satisfying the following condition:

$$1 < AC_I/AC_{II}$$

wherein $AC_I$ designates the total sum of the absolute values of the reciprocal of the product of the focal length and the Abbe number ($|1/(fi*\nu i)|$) of each lens element in said positive first lens group; and $AC_{II}$ designates the total sum of the absolute values of the reciprocal of the product of the focal lengths and the Abbe number ($|1/(fi*\nu i)|$) of each lens element in said positive second lens group.

* * * * *